No. 663,260. Patented Dec. 4, 1900.
C. G. DEMING.
HINGE.
(Application filed Jan. 3, 1900.)
(No Model.)

Witnesses:
H. A. Daniels
Joseph W. Purdue

Inventor:
Charles G. Deming
By Thomas P. Simpson
Attorney

UNITED STATES PATENT OFFICE.

CHARLES GAYLORD DEMING, OF KINGSTON, NEW YORK.

HINGE.

SPECIFICATION forming part of Letters Patent No. 663,260, dated December 4, 1900.

Application filed January 3, 1900. Serial No. 276. (No model.)

*To all whom it may concern:*

Be it known that I, CHARLES GAYLORD DEMING, a citizen of the United States, residing at Kingston, in the county of Ulster and State of New York, have invented certain new and useful Improvements in Hinges; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates generally to "concealed" or non-projecting hinges; and it consists in the construction thereof substantially as hereinafter shown, described, and claimed.

Figure 1:
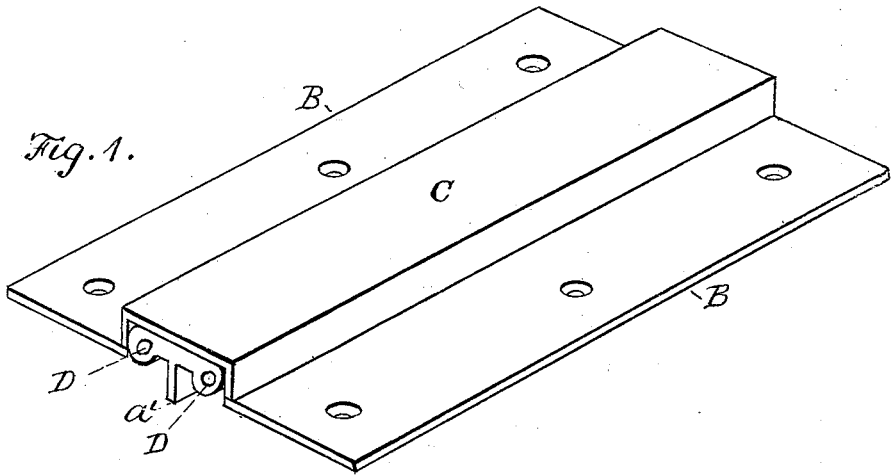
Figure 2:
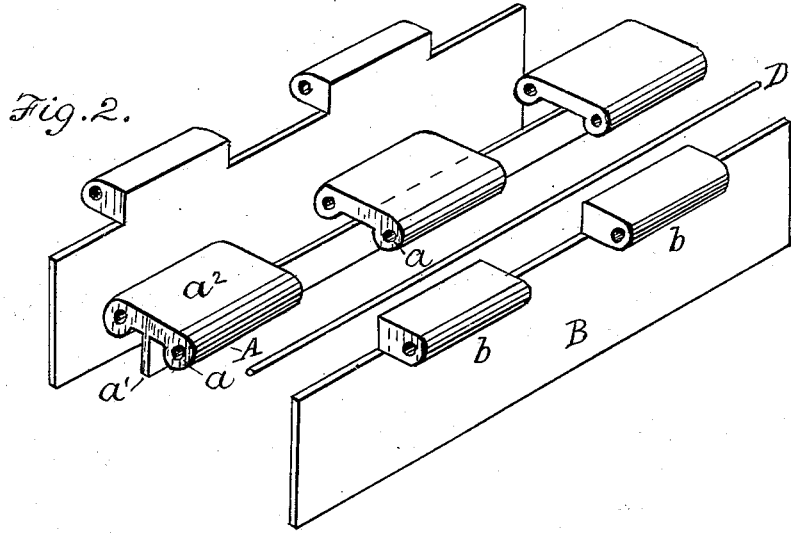

Figure 1 of the drawings is a perspective view showing my hinge with all its parts in place and in their true relative position to each other; Fig. 2, a similar view showing the hinge with the cover removed and all the parts separate from each other.

In the drawings, A represents the median or middle piece of the hinge, which is made in T form at the middle and ends, but intermediately are left vacant spaces, into which fit the tubular lugs $b$ of the leaves B B. These lugs $b$ register with the holes $a$ in the piece A, so as to receive the pintles D, by which they are secured together, so that the leaves may turn freely. The T-piece having a stem $a'$ and the plate $a^2$ at right angles to each other while the stem is in the longitudinal middle of the plates the leaves will readily fold up against the stem $a'$ and parallel to each other.

I make the piano-hinge in alternate couples. The leaves B are formed with lugs $b$, which project outwardly from the inner edge of the leaves and extend outwardly at right angles to the plane thereof, the inner faces of said lugs coinciding with the inner faces of the leaves.

C represents the cap or cover, which may be fastened in any desired way to the plates $a^2$, but so as to allow the leaves to unfold until they are in the same plane, as clearly shown in Fig. 1 of the drawings.

Having thus described all that is necessary to a full understanding of my invention, what I claim as new, and desire to protect by Letters Patent, is—

The combination with a hinge comprising in its construction the leaves B B provided with spaced lugs $b\ b$ projecting outwardly from the inner faces thereof and at right angles thereto, a continuous T-shaped link A having the spaced lugs $a$ projecting outwardly on either side of the stem $a'$, the spaces between the lugs extending across the upper face of said link and adapted to register with said lugs $b\ b$ and pintle connections between said link and leaves, of a cover C adapted to be secured to the upper face of the link and project over the connected lugs of the link and leaves and constructed to limit the unfolding of the leaves substantially as and for the purpose shown and described.

In testimony whereof I affix my signature in presence of two witnesses.

CHARLES GAYLORD DEMING.

Witnesses:
WILLIAM C. DEWITT, Jr.,
HUMPHREY EVERETT.